(12) United States Patent
Ma

(10) Patent No.: US 9,203,888 B2
(45) Date of Patent: Dec. 1, 2015

(54) SERVER-SIDE CLASS-OF-SERVICE-BASED BANDWIDTH MANAGEMENT IN OVER-THE-TOP VIDEO DELIVERY

(71) Applicant: Ericsson AB, Stockholm (SE)

(72) Inventor: Kevin J. Ma, Nashua, NH (US)

(73) Assignee: ERICSSON AB, Stockholm (SE)

( * ) Notice: Subject to any disclaimer, the term of this patent is extended or adjusted under 35 U.S.C. 154(b) by 314 days.

(21) Appl. No.: 13/873,879

(22) Filed: Apr. 30, 2013

(65) Prior Publication Data

US 2013/0297815 A1    Nov. 7, 2013

Related U.S. Application Data

(60) Provisional application No. 61/640,860, filed on May 1, 2012.

(51) Int. Cl.
*G06F 15/16*  (2006.01)
*H04L 29/06*  (2006.01)
*H04L 29/08*  (2006.01)

(52) U.S. Cl.
CPC ............ *H04L 65/608* (2013.01); *H04L 67/322* (2013.01); *H04L 67/325* (2013.01); *H04L 69/28* (2013.01)

(58) Field of Classification Search
CPC ....... H04L 65/608; H04L 65/60; H04L 65/80; H04L 67/2804; H04L 67/14
USPC .................................... 709/203, 231; 370/231
See application file for complete search history.

(56) References Cited

U.S. PATENT DOCUMENTS

| | | | | |
|---|---|---|---|---|
| 7,143,181 | B2 * | 11/2006 | Koka et al. | 709/236 |
| 7,224,703 | B2 * | 5/2007 | Antal et al. | 370/473 |
| 7,716,449 | B2 * | 5/2010 | Kessler | 711/170 |
| 8,626,942 | B2 * | 1/2014 | Edelman et al. | 709/231 |
| 8,819,288 | B2 * | 8/2014 | Abdo et al. | 709/247 |
| 2011/0191414 | A1 * | 8/2011 | Ma et al. | 709/203 |
| 2013/0304916 | A1 * | 11/2013 | Hodapp | 709/224 |

* cited by examiner

*Primary Examiner* — Frantz Jean

(57) ABSTRACT

A server device delivers content to a client device by sending the content as a series of segments using chunked delivery. The sending is paced in accordance with a class of service for the client device, the class of service having an associated target chunk send time that decreases with higher classes of service. Pacing includes sending a chunk over an actual chunk send time and calculating an inter-chunk delay as a difference between the target chunk send time and the actual chunk send time. If the inter-chunk delay is positive, then the server waits the inter-chunk delay before beginning to send a next successive chunk, and otherwise it immediately begins sending the next successive chunk. The server also employs bitrate selection to manage client use of available bandwidth.

19 Claims, 4 Drawing Sheets

SERVER-SIDE CLASS-OF-SERVICE-BASED BANDWIDTH MANAGEMENT IN OVER-THE-TOP VIDEO DELIVERY

BACKGROUND

This invention relates in general to over-the-top (OTT) media delivery and more specifically to providing differentiated service to independent OTT video streaming clients.

Near-real-time delivery protocols are popular for OTT video delivery due to their simplicity, their ability to adapt to varying network conditions through the use of rate adaptation, and the low cost of deployment using commodity HTTP delivery infrastructures. OTT video delivery typically relies on content delivery networks (CDNs) optimized for large scale deployment of generic data files, via HTTP, to large numbers of clients across multiple geographic regions. Unlike the closed-circuit nature of broadcast television, which requires access to a private multiple service operator (MSO) network, using an MSO provided and provisioned client device, e.g., a leased set-top-box (STB), which relies on customized delivery and encryption protocols to maintain control over content delivery, OTT delivered content is accessible to any network connected device which supports the ubiquitous HTTP protocol. Content is made available through CDNs, though playback may be restricted using digital rights management (DRM) which may require authentication to acquire content encryption information.

Service providers and network operators rely on closed networks and operator controlled devices to be able to manage bandwidth and enforce service differentiation by explicitly controlling each client in the network. The use of commoditized CDN infrastructures, which provide free access to content by clients, inhibits the ability of service providers and network operators to control client bandwidth usage. Independent OTT client implementations tend to be greedy in nature which can prevent fair access to network resources between clients, and limits the methods available for supporting differentiated service enforcement. The ability to provide differentiated services is an important factor in the monetization of content delivery. Alternate methods are needed to efficiently enforce class of service differentiation in OTT video delivery.

SUMMARY

OTT clients typically retrieve content in segments using the HTTP protocol. HTTP-based delivery typically uses an as-fast-as-possible download paradigm. Clients estimate throughput based on the download time of the segment. The throughput $T=S/D$, where D is the download time for the segment in seconds and S is the size of the segment in bits. In networks with low throughput, clients will detect the low throughput due to its long download time D. In networks with high throughput, clients will have a much lower download time D. In high throughput networks, greedy clients will detect the availability of excess capacity and will attempt to use it. This operation may conflict with proper operation of other clients, and it does not lend itself to tiering of service to enable a service provider to increase operational revenues.

Paced delivery of content can be used to influence client rate selection. Paced delivery of content can be used to artificially increase the download time D, lowering the client throughput estimate T, and tempering the greediness of the client. Using different pacing rates for different classes of service allows for class of service-based differentiation of client bandwidth allocations.

A method is provided for using paced segment delivery to enforce class of service differentiation between clients without requiring explicit coordination between clients. In one embodiment, a server or network proxy processes a content request from a client and detects that the request is for video content for example. Video content may be designated explicitly using content metadata provided by the content producer. In another embodiment, video content is recognized based on file extension (e.g., .ts, .mp4, etc.). The server or network proxy then determines the encoded bitrate of the video. In one embodiment, the encoded bitrate of the video is specified explicitly using content metadata by the content producer. In one embodiment, the content metadata is expressed through a manifest file (e.g., an m3u8 or ism/ismc files). In another embodiment, the encoded bitrate of the video is gleaned from the content itself by parsing out embedded metadata and/or timestamp information, as should be familiar to those skilled in the art. The server or network proxy responds to the content request by sending the requested content at a paced rate $R=B*P$, where B is the encoded bitrate of the video and P is a decimal class-of-service multiplier generally in some range above 0. Under ideal conditions, a P value of 1 uses the minimum possible network resources to deliver the content without incurring underrun issues. Larger P values allow for higher throughput and greater elasticity in response to network jitter. In one embodiment, servers only use P values in the range 1 to 100, where the server can select an alternate bitrate if the bitrate of a requested content is too high. This is instead of using a P value less than 1 to influence the client to switch to a lower bitrate (reducing the latency before the rate switch and eliminating the wasted bandwidth from sending data that will not be consumable by the client because the download will time out to prevent underrun in the client). The selection of the alternate bitrate may follow the provisions of PCT patent publication WO/2011/139305 for Method And Apparatus For Carrier Controlled Dynamic Rate Adaptation And Client Playout Rate Reduction, the entirety of which is incorporated herein by reference. In one embodiment, network proxies only use P values in the range 0 to 1, where the network proxy cannot force the server to send faster but the network proxy can further delay delivery of the content. In this case, if a server has selected a P value P' greater than one, and the proxy has selected a P value P'' less than one, as long as P' times P'' is greater than or equal to one, the paced throughput should still be sufficient to send the segment without having to time out the download to prevent underrun.

In one embodiment, pacing is performed by sending fixed chunk sizes C and placing pacing delays in between chunk sends. In one embodiment, the chunk size C is selected to be smaller than a TCP window size used for controlling transmission in the TCP protocol, to enable accurate influencing of clients that use TCP-based bandwidth estimation. In one embodiment, the chunk size C is set to the maximum segment size (MSS) of the network. One example of a suitable pacing algorithm is shown in PCT patent publication WO/2010/045109 for Method And Apparatus For Efficient Http Data Streaming.

In one embodiment, P values are determined a priori by the content service provider and mapped explicitly to individual classes of service. In one embodiment, the server or network proxy looks up the class of service for the subscriber issuing each request. In one embodiment, subscriber identification is provided to the server or network proxy by the client in an HTTP header (e.g., a cookie value or a proprietary header value). In another embodiment, subscriber identification is provided in the query string of the request URI. In another embodiment, subscriber identification is gleaned from the source IP address of the client request. The server or network proxy uses the subscriber identification to retrieve the class of service and P value for that subscriber. In one embodiment, the server or network proxy presents the subscriber identification to a subscriber management system and retrieves the class of service level and P value for that subscriber. In another embodiment, the server or network proxy maintains a local database of subscriber information, from which to retrieve the class of service level and P value for that subscriber.

In one embodiment, the server or network proxy upon determining the bitrate of the requested content compares the aggregate bitrate of all outstanding requests being processed through the server or network proxy with a maximum capacity threshold. If the bitrate of the requested content will cause the aggregate bitrate of all outstanding requests being processed through the server or network proxy to exceed the maximum capacity threshold, the server or network proxy may select an alternate content representation with a lower bitrate. In one embodiment, clients with higher classes of service are given preferential access to higher bitrate content representations. This is accomplished by more aggressively lowering the bitrate of clients with lower classes of service such that it becomes unnecessary to lower the bitrate of clients with higher classes of service. In one embodiment, the server or network proxy maintains a list of all video streaming sessions currently active and the class of service associated with each client who has initiated a video streaming session. In one embodiment, a video streaming session is determined based on the temporal proximity of segment requests for the same content. A session is deemed to be active if consecutive segment requests have been received from the same client within N*L, where L is the segment duration and N is the session request jitter multiplier (e.g., N=2 segments). The server or network proxy uses an algorithm to assign maximum bitrates to each session. In one embodiment, the server or network proxy uses a breadth-first algorithm which assigns an equal bitrate to all clients within a set of classes of service, until not all clients can be given the next higher bitrate. Clients with lower classes of service are then eliminated from further consideration, and bitrate allocation continues with a further subset of classes of service. In one embodiment, a server will select an alternate content representation and return the alternate content representation in the content response. In another embodiment, the network proxy will select an alternate content representation and replace the content representation in the content request that the network proxy forwards to the server.

A system is also specified for implementing a server or network proxy in accordance with the provisions of the above method.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Techniques for bandwidth management in over-the-top (OTT) content delivery operations include (I) server-based techniques and (II) client-based techniques, where the server-based techniques include a subset usable by a network proxy.

The description below is divided into two distinct sections I and II for the server-based techniques and client-based techniques respectively. A network may have servers using the server-based techniques with or without clients using the client-based techniques. Alternatively, there may be clients using the client-based techniques with or without servers using the server-based techniques.

When the techniques are used together, there are two cases involving priority multipliers or class-of-service values P referred to in the description below—coordinated and non-coordinated. In coordinated operation the server knows the client P value, while in non-coordinated operation the server does not know the client P value. Theoretically there could be a technique in which the client knows the server P value, but such a technique might have limited use. Typically, servers are more powerful than clients and are directly controlled by service providers that need to manage network bandwidth. Thus, it may be most useful for a server to adapt to a client P value to achieve any desired effect.

If the server does not know the client P value, it can correlate a requested bitrate with changes in its own (server) P value. Ultimately, if the server's goal is to reduce the bitrate of the client to a target bitrate, it can adjust its P value to do so. If the server overshoots because the client has a small P value, then it can adjust its own (server) P value to raise the client's bitrate back up.

If the server does know the client P value, it can adjust its own P value to compensate, e.g., adjusted_server_P=server_P/client_P. However, this can cause the server to expend more resources on lower class-of-service (CoS) clients, which may not be desirable. It may be possible to apply a cap to the adjusted_server_P value, on a per CoS basis.

As another feature, if the server does have a target bitrate for each client, it could adjust its P value to try to accommodate the client. If the client is on a jittery network (high variability of available bandwidth), for example, the server could detect requested bitrate thrashing (rapid switching between requested bitrates) and adjust its P value to try to smooth out the bitrates being requested. If the client keeps falling below the target bitrate, the server could increase the P value slightly. If the client keeps reaching for the next higher bitrate, the server could reduce the P value slightly.

Figure 1:
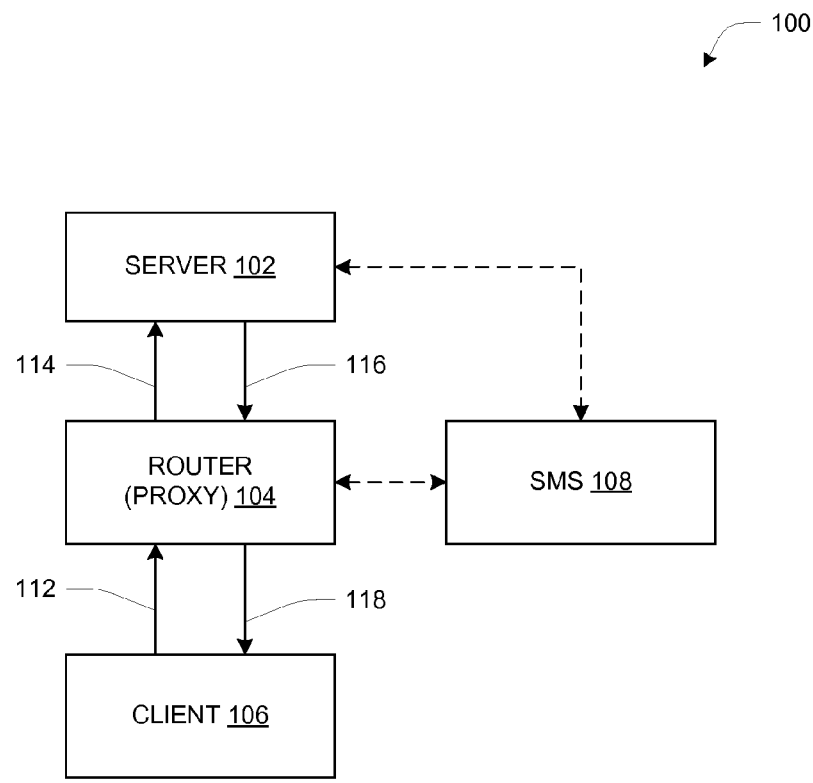
FIG. 1 is a block diagram of a system which is capable of conducting end-to-end content delivery procedures, in accordance with various embodiments of the invention.

In FIG. 1 is a block diagram 100 for one embodiment of the present invention. A client device or client 106 issues a content request 112/114 to a server 102 which responds to the content request 112/114 with a content response 116/118. The content requests 112/114 and content responses 116/118 are carried on a communications network (not shown) and may traverse one or more intermediate routers 104. In one embodiment of server-side pacing, server 102 initiates pacing on the content response 116/118. In another embodiment, the intermediate router 104 may act as a network proxy for the request 112 and apply pacing on the content response 118. In the network proxy case, the proxied request 114 and proxied response 116 may or may not be paced. If the content response 116 from the server 102 is paced, the intermediate router 104 may initiate further pacing on the content response 118 from the intermediate router 104 to the client 106. Further references to the intermediate router 104 shall refer to a network proxy 104. Also, the term "origin endpoint" is used to refer to a server device 102 as distinct from a proxy 104.

FIG. 1 also shows a subscriber management system (SMS) 108. The subscriber management system 108 may be queried to retrieve class of service information for client 106. As also described below, client-side pacing may be used either instead of or in conjunction with server-side pacing.

The devices shown in FIG. 1, including the server 102, proxy 104, and client 106, may be realized as physical computers as generally known in the art, with hardware including one or more processors, memory, and interface circuitry interconnected by data interconnections such as one or more high-speed data buses. The interface circuitry provides a hardware connection to communications networks over which the messages 112 etc. are transferred. The processor(s) with connected memory may also be referred to as "processing circuitry" herein. There may also be local storage such as a local-attached disk drive or flash drive. In operation, the memory stores data and instructions of system software (e.g., operating system) and one or more application programs which are executed by the processor(s) to cause the hardware to function in a software-defined manner. Thus the computer hardware executing instructions of a content delivery application, such as described herein, can be referred to as a content delivery circuit or content delivery component, and it will be understood that a collection of such circuits or components can all be realized and interact with each other as one or more sets of computer processing hardware executing different computer programs as generally known in the art.

I. Server-Based Bandwidth Management

As outlined above, the server 102 and/or proxy 104 employ server-side techniques for managing the use of content delivery bandwidth by client devices such as client 106. The techniques include both pacing of delivery as well as intelligent switching among different bitrates of content encoding, and these further involve a "class of service" component that divides clients into different classes for purposes of allocating use of delivery bandwidth. In one embodiment, class of service may be represented by a variable referred to herein as "P", where higher values of P correspond to higher classes of service and greater allocated bandwidth. P values are used as multipliers of delivery rates. For example, P may be in the range of 1 to 100 and effectively scale a minimal required delivery rate to a higher rate reflecting a certain class of service. Alternatively, P may be in the range of 0 to 1 and effectively scale one delivery rate to a corresponding lower delivery rate reflecting a certain class of service. In one embodiment, the server 102 may employ the up-scaling P values in the range of 1 to 100, while the proxy 104 may perform no additional scaling or may employ down-scaling P values in the range of 0 to 1. As described more below, reducing the delivery rate can cause certain client devices to automatically shift to a lower-bitrate encoding and thus reduce the client's use of delivery bandwidth.

Figure 2:
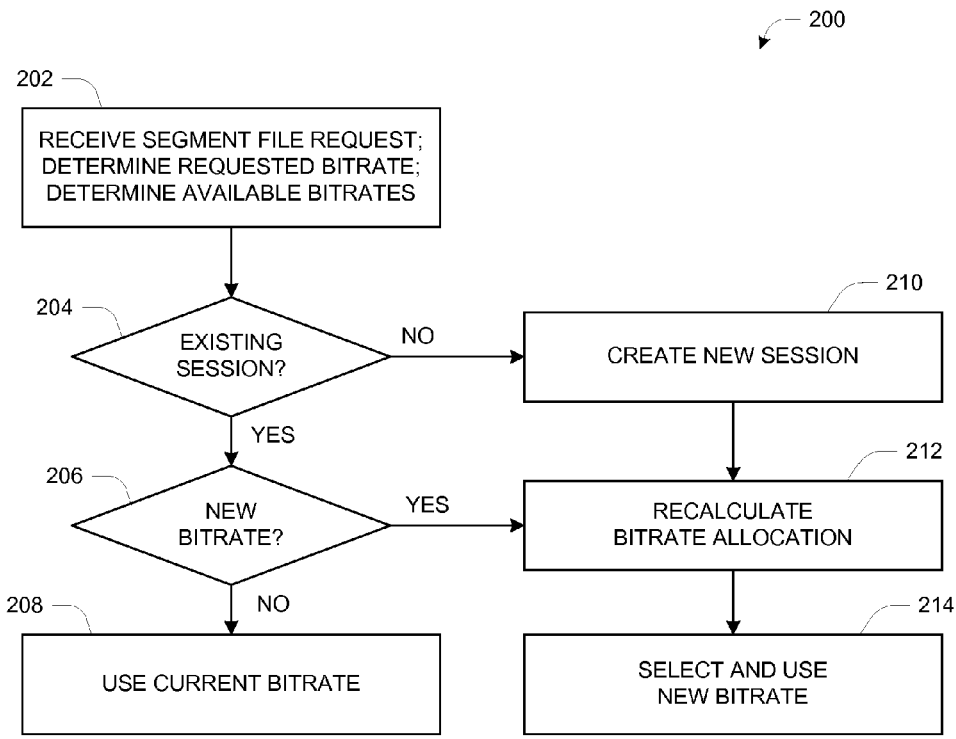
FIG. 2 is a flow chart showing a method for performing rate selection, in accordance with an embodiment of the present invention.

FIG. 2 is a flow chart 200 describing a server-side process for performing content bitrate selection with class of service differentiation enforcement. In step 202, the server 102 or network proxy 104 receives a content request for a video segment from the client 106. The server 102 or network proxy 104 parses the request to determine the bitrate of the request (i.e., which bitrate encoding from among a set of different-bitrate encodings is being requested). The server 102 or network proxy 104 also looks up the bitrates of alternate representations for the requested content before proceeding to step 204.

In step 204, the server 102 or network proxy 104 checks to see if a session already exists for the client 106 and the requested content. In one embodiment, a video streaming session is determined based on the temporal proximity of segment requests for the same content by a given client 106. A session is deemed to be active if consecutive segment requests have been received from the same client 106 within N*L, where L is the segment duration and N is the session request jitter multiplier (e.g., N=2 segments). In one embodiment, the client 106 is identified by an HTTP header (e.g., a cookie value or a proprietary header value). In another embodiment, the client 106 is identified by a query string parameter of the request URI. In another embodiment, client 106 is identified by its source IP address. In one embodiment, an opaque token provided in an HTTP header is used to identify the client 106 to the subscriber management system 108. In another embodiment, the source IP address of client 106 is used to identify client 106 to the subscriber management system 108.

At 204 the server 102 or network proxy 104 may also retrieve a class of service for client 106 from the subscriber management system 108. The class of service may be represented by a particular value of a variable identified as "P" herein, and it is used in subsequent operations as described below.

If no session exists in step 204, processing continues to step 210 where a session is created. Once a new session is created, processing continues to step 212 which is described below. If a session already exists in step 204, processing continues to step 206, where the server 102 or network proxy 104 checks to see if the client 106 is requesting a new bitrate (i.e., a bitrate different from that of preceding requests). If the bitrate has not changed, processing continues to step 208, otherwise processing continues to step 212. At 208, the server 102 or network proxy 104 continues the session at the same (current) bitrate. In step 212, if a new session was created or the client 106 is now requesting a different bitrate, the server 102 or network proxy 104 recalculates the bitrate allocation for all clients 106, and then at 214 it selects the appropriate bitrate for use in subsequent delivery to this client 106. Details of bitrate allocation are given below.

In one embodiment, if the bitrate requested at 206 by client 106 is less than a maximum bitrate allocation calculated at 212, then the bitrate requested by client 106 is selected at 214. However, if the bitrate requested by client 106 is greater than the maximum bitrate allocation calculated by the server 102 or network proxy 104, then the maximum bitrate is selected. In another embodiment, regardless of what bitrate was requested by the client 106, the maximum bitrate allocation is selected. In one embodiment, a server 102 will then begin sending the data for the content representation corresponding to the selected bitrate, in response to the content request of client 106. In another embodiment, a network proxy 104 will forward a modified content request to the server 102 requesting the selected bitrate, possibly different from the bitrate requested by client 106.

For the recalculation of bitrate allocation at 212, the server 102 or network proxy 104 may use a breadth-first algorithm such as described below. This approach is a multi-pass approach, and in each pass a given bitrate is assigned to all clients within a set of classes of service, until not all clients can be given the next higher bitrate. Clients with lower classes of service are then eliminated from further consideration, and another pass is performed for the remaining clients (of higher classes of service) to assign higher bitrates to them if possible. This process may be repeated.

The following is a pseudocode description of an example breadth-first bitrate allocation algorithm that may be used. The term "cos" refers to "class of service".

```
int max_capacity;
int num_bitrates;
int bitrates[num_bitrates];
int num_cos;
int num_clients_per_cos[num_cos];
int num_clients;
client_max_bitrate[num_clients];
client_cos[num_clients];
int usage = 0;
int cos = 0;
int bitrate = 0;
int clients = num_clients;
    for (int i = 0; i < num_clients; i++) {
client_max_bitrate[i] = bitrates[min_bitrate]
}
++bitrate;
while (cos < num_cos && bitrate < num_bitrates) {
    usage = 0;
    for (int i = 0; i < num_clients; i++) {
        usage += client_max_bitrate[i];
    }
    if (clients * (bitrates[bitrate] -
                bitrates[bitrate - 1]) > max_capacity - usage)
        clients -= num_clients_per_cos[cos];
        ++cos;
    } else {
        for (int i = 0; i < num_clients; i++) {
            if (client_cos[i] >= cos) {
                client_max_bitrate[i] = bitrates[bitrate];
            }
        }
        ++bitrate;
    }
}
```

Figure 3:
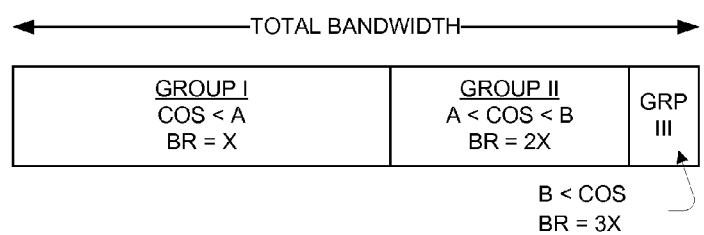
FIG. 3 is a schematic diagram of a simplified example of download bandwidth allocation among sets of clients.

FIG. 3 provides a simplified depiction of the operation of the above algorithm. The result in this example is the division of the total available bandwidth among clients 106 in three classes of service. In a first pass all clients are assigned a first bitrate (BR) X. At that point enough overall bandwidth has been allocated that not all clients can be given the next bitrate, which is 2X in this example, however, there is enough excess bandwidth to increase the bitrate of some clients. Thus the clients of Group I having classes of service (COS) below a first threshold A are removed from further consideration, and these retain the BR allocation of X. When this process is repeated for the remaining clients, it results in a second group, Group II, having COS between A and a second higher threshold B, being allocated the next higher bitrate 2X. The remaining clients having COS greater than B form Group III and are allocated the next higher bitrate 3X. It will be appreciated that the density of clients diminishes in successively higher groups, because each client is using more bandwidth than each client in a lower class. As a simple example, imagine that there are 20 units of bandwidth available. These might be distributed among 16 clients as follows:

| Group I | 13 clients with COS < A; 13 units allocated (13 × 1) |
| Group II | 2 clients with A < COS < B; 4 units allocated (2 × 2) |
| Group III | 1 client with B < COS; 3 units total (1 × 3) |

Though the example shows bitrate allocation as a linear multiple, it will be appreciated that the actual intervals between grouping thresholds are likely to be irregular and correspond to the encoded bitrates of the content being delivered.

Figure 4:
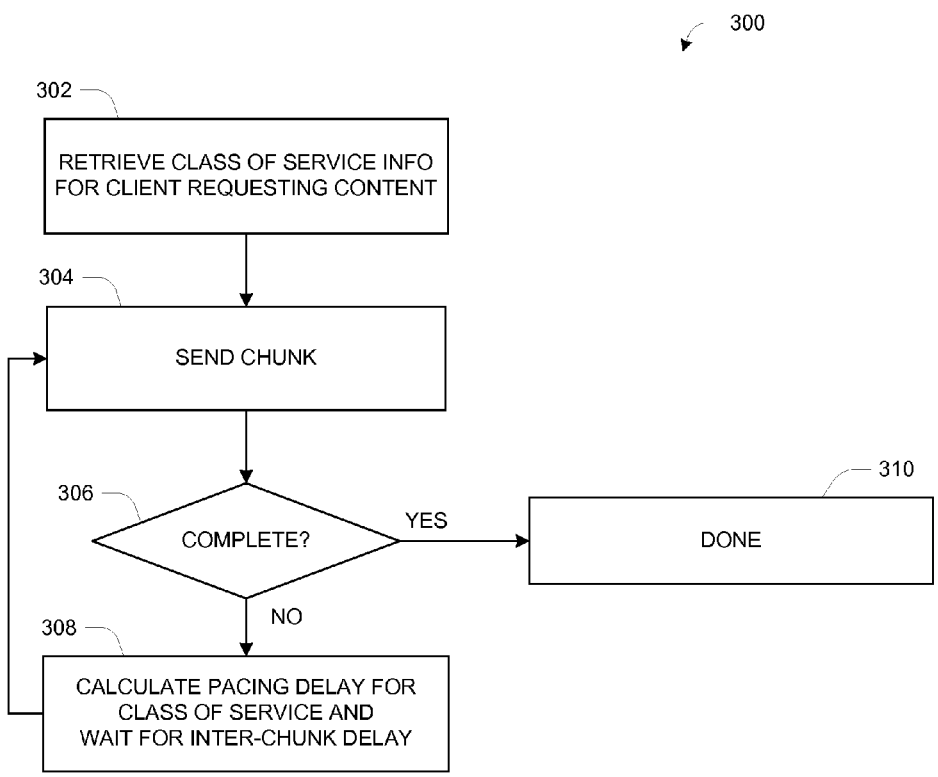
FIG. 4 is a flow chart showing a server-based method for performing paced delivery, in accordance with an embodiment of the present invention.

FIG. 4 is a flow chart 300 describing a server-side process for performing content delivery pacing with class of service differentiation enforcement. Generally, delivery is done in a "chunked" manner, i.e., dividing each content segment into smaller units called "chunks" that are individually delivered as a unit but with temporal spacing between successive chunks to attain a desired overall delivery rate. One known mechanism for chunked delivery employs the HTTP protocol.

In step 302, the server 102 or network proxy 104 retrieves the class of service parameters for the client 106. In one embodiment, a server 102 retrieves a decimal pacing rate multiplier in the range 1 to 100. In another embodiment, a network proxy 104 retrieves a decimal pacing rate multiplier in the range 0 to 1. In one embodiment, the client 106 is identified by an HTTP header (e.g., a cookie value or a proprietary header value). In another embodiment, the client 106 is identified by a query string parameter of the request URI. In another embodiment, client 106 is identified by its source IP address. In one embodiment, the class of service multiplier is retrieved from a subscriber management system 108. In one embodiment, an opaque token provided in an HTTP header is used to identify the client 106 to the subscriber management system 108. In another embodiment, the source IP address of client 106 is used to identify client 106 to the subscriber management system 108. Once the pacing multiplier has been retrieved, processing continues to step 304.

In step 304, the server 102 or network proxy 104 sends a chunk of data to client 106. In one embodiment, the chunk size C is selected to be smaller than a value known as the TCP window size, a standard parameter in the Transmission Control Protocol (TCP) for limiting the number of unacknowledged messages outstanding at a time. Limiting C in this manner enables the technique to have a desired effect on clients 106 that use TCP-based bandwidth estimation. If chunks larger than the TCP window size are used with clients 106 that make TCP-based bandwidth estimates, it may trigger estimation of burst throughput rather than an aggregate segment delivery throughput. In one embodiment, the chunk size C is set to the TCP Maximum Segment Size (MSS) of the network.

Processing then continues to step 306 where the server 102 or network proxy 104 checks to see if the segment has been completely sent. If the segment is complete, processing continues to step 310 where processing for this segment ends. If the segment delivery is not yet complete, processing continues to step 308 where the server 102 or network proxy 104 calculates the pacing delay or inter-chunk delay required to attain a target delivery rate (details are provided below) and waits the inter-chunk delay period before continuing back to step 304 where the next chunk of data is sent to client 106.

Step 308 employs a target pacing rate which is equal to (B*P), where B is the encoded bitrate of the content and P is the class-of-service multiplier. It will be appreciated that P=1 corresponds exactly to the encoded rate B, which is the minimum required for playback, while higher values correspond to delivery rates higher than the encoded rate. A client 106 may desire higher delivery rate for a number of reasons, including for example to maintain fullness of a receive buffer and thereby provide high-fidelity playback even in networks experiencing considerable variability in delivery times.

Given a chunk of size C, the target send time of the chunk (i.e., the amount of time required to send the chunk) is $C/(B*P)$. The actual send time of the chunk is denoted Q.

The calculation at 308 is then as follows:

$$\text{Pacing delay} = \max(0, C/(B*P) - Q)$$

This can be understood by considering two cases. If it takes longer than the target time to send a chunk, then no additional delay should occur and the next chunk should be sent immediately. In this case, the value C/(B*P)−Q is less than 0, so max(0, C/(B*P)−Q) is equal to 0 and a pacing delay of 0 is used (i.e., no waiting before sending next chunk). If a chunk is sent faster than the target time, then the balance of the target time should be waited before sending another chunk. In this case, the value C/(B*P)−Q is greater than 0, so max(0, C/(B*P)−Q) provides the non-zero balance of the target time to be used as the pacing delay.

It will be appreciated that the above process has different results and effects with clients of different classes of service. As P increases, the target send time and pacing rate decrease accordingly. Generally the inter-chunk delay will be smaller, and may more often be 0 for given network circumstances. Thus, high-COS clients 106 will experience high download bandwidth. For smaller P, target send time lengthens as does the inter-chunk delay period. Thus, low-COS clients 106 experience low download bandwidth and longer inter-chunk dwell periods. This technique alone helps to achieve a desired COS-based allocation of bandwidth, and it can also affect client behavior in a manner that provides a separate bandwidth adjustment mechanism, as described more below.

II. Client-Based Bandwidth Management

Figure 5:
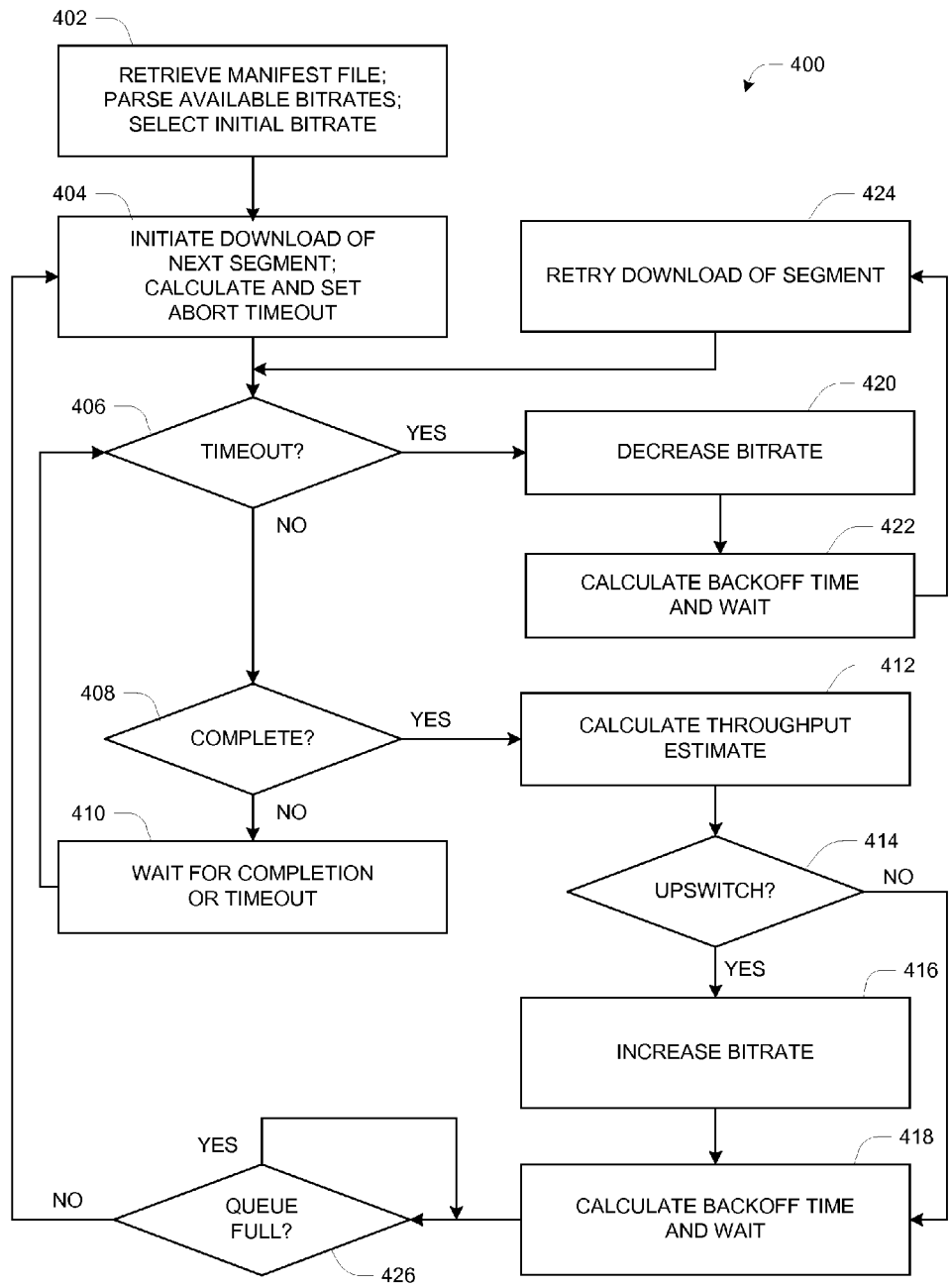
FIG. 5 is a flow chart showing a client-based method for performing rate adaptation, in accordance with an embodiment of the present invention.

FIG. 5 is a flow chart 400 describing a client-based process for performing rate adaptation with class of service differentiation enforcement. Overall, a client 106 uses an abort mechanism to selectively decrease the encoded bitrate of content being requested, along with bandwidth or throughput estimates to selectively increase bitrate. Calculations include a class-of-service component so that clients of different classes automatically arrive at desired different content delivery rates.

In step 402, the client 106 issues a request to server 102 for a manifest file. The client 106 parses the manifest file to determine the available bitrates, and then selects an initial bitrate. In one embodiment, the client 106 selects an initial bitrate based on network connectivity (e.g., high bitrate for WiFi or low bitrate for 3G/4G cellular). In another embodiment, the client 106 always selects a low bitrate to minimize initial playback latency. Processing continues to step 404 where the client 106 issues a request to server 102 for a content segment. The client 106 also calculates an abort timeout based on the class of service of the subscriber. In one embodiment, the abort timeout A=L*P, where L is the content segment playback duration and P is a fixed decimal multiplier value between 0 and 1 representing the class of service. In one embodiment, the P value is hard coded in the client application, where subscribers within the different classes of service are provided different applications which enforce the class of service differentiation associated with their subscription level. In another embodiment, the client application looks up the class of service for the subscriber. In one embodiment, the client application presents credentials of the subscriber (e.g., username and password) to the subscriber management system 108 (FIG. 1) and retrieves the class of service level and P value for that subscriber.

Processing continues to step 406 where an abort timeout check is performed. If the abort timeout has occurred, processing proceeds to step 420, otherwise processing continues to step 408 where a completion check is performed. If the segment retrieval is complete, processing proceeds to step 412, otherwise processing continues to step 410 where completion and abort checks continue by returning to step 406. Though steps 406-410 are shown as a serialized process which essentially polls the segment request connection status to determine if the connection has completed, or if a timeout has occurred, the detection of completion or timeout may be performed asynchronously, such as using callback methods, as should be understood by those skilled in the art.

In step 420, when an abort timeout has occurred the client 106 selects a lower bitrate to use for subsequent segment requests, if a lower bitrate exists. In one embodiment, the client 106 selects the next lower bitrate, relative to the current bitrate for which the content request failed. In another embodiment, the client 106 selects the lowest bitrate available. In another embodiment, the client 106 selects the highest available bitrate that is lower than the estimated throughput of the aborted download. In one embodiment, the estimated throughput is calculated as E=X/A, where X is the number of bits downloaded when the abort timeout occurred. Processing then proceeds to step 422 where a backoff time is calculated. In one embodiment, a backoff time B=L−A is used to ensure that the client does not use more than its fixed percentage bandwidth allocation. The client 106 waits in step 422 for B seconds and then proceeds to step 424 where it retries the content request, but at the lower bitrate.

In step 412, when the segment retrieval completes successfully the client 106 estimates the throughput for the retrieval. In one embodiment, the estimated throughput is calculated as T=S/D. Processing then proceeds to step 414 where the estimated throughput is used to determine if a bitrate up-switch is warranted. In one embodiment, bitrate up-switches are only allowed when a segment queue used by the client 106 to temporarily store downloaded segments is full. In one embodiment, segment up-switches require that the current throughput estimate exceeds the bitrate requirement of the content representation being switched to, e.g., T>R/L*A.

If a bitrate up-switch is not warranted, processing continues to step 418, and otherwise processing continues to step 416 where a new bitrate is selected, before continuing to step 418. In one embodiment, at 416 the client 106 selects the next higher bitrate, relative to the current bitrate for which the content request which just completed. In another embodiment, the client 106 selects the highest available bitrate that is lower than the estimated throughput of the content request which just completed. In another embodiment, the client 106 selects the highest available bitrate that is lower than the estimated throughput of the last N consecutive content requests which have completed successfully.

In step 418, the backoff time is calculated. In one embodiment, the backoff time B=L−D is used to ensure that the client does not use more than its fixed percentage bandwidth allocation. In another embodiment, the backoff time B=max(0, L*P−D) is used to enable a more aggressive retrieval of segments by the client 106, when successful download occur. The client 106 waits in step 418 for B seconds and then proceeds to step 426 where it checks the queue (segment queue) of temporarily downloaded segments. If the queue is full, processing returns back to step 426 until such time as a segment has drained from the queue. The queue may fill because the player has been paused and the rendering of segment data has been temporarily suspended, or because aggressive download has allowed the queue to fill faster than the normal playout rate of the already downloaded content. Once the queue is no longer full, processing proceeds back to step 404 where the client 106 issues a content request for the next segment. Although the queue checking in step 426 is shown as a serialized process which essentially polls the queue size to determine when a segment has drained, the detection of queue drain may be performed asynchronously, such as using callback methods, as should be understood by those skilled in the art.

In the process of FIG. 5, bitrate down-switches occur when a download is aborted as described above with reference to steps 406 and 420-424. In one embodiment, a bitrate down-switch may also occur when a segment queue underrun occurs, i.e., when a next segment is required for playback but that segment has not yet been downloaded.

When each of a set of clients 106 employs the process of FIG. 5, operation will automatically adjust to an appropriate COS-based allocation of bandwidth among the clients. High-COS clients will employ longer abort timeouts and therefore experience little or no aborting of requests. At the same time, they will be more likely to avail themselves of upswitch opportunities. Lower-COS clients will experience the opposite—greater likelihood of aborting due to shorter abort timeouts, and fewer opportunities for upswitching. Additionally, as mentioned above a proxy 104 can lengthen pacing delay to induce a downswitch in clients having sufficiently short abort timeouts.

While various embodiments of the invention have been particularly shown and described, it will be understood by those skilled in the art that various changes in form and details may be made therein without departing from the spirit and scope of the invention as defined by the appended claims.

What is claimed is:

1. A method by which a server device delivers content to a client device, comprising:
    sending the content to the client device as a series of segments, the segments being sent using chunked delivery by which each segment is sent as a series of chunks; and
    pacing the sending in accordance with a class of service for the client device, the class of service having an associated target chunk send time over which each chunk is to be sent to the client device, the target chunk send time decreasing with higher classes of service, the pacing including:
        sending a chunk over an actual chunk send time;
        calculating an inter-chunk delay as a difference between the target chunk send time and the actual chunk send time; and
        if the inter-chunk delay is positive, then waiting the inter-chunk delay before beginning to send a next successive chunk, and otherwise immediately beginning to send the next successive chunk.

2. A method according to claim 1, wherein the class of service has a numerical class of service value, and the target chunk send time is calculated as an inverse of a product of the class of service value and an encoded bitrate for the segment.

3. A method according to claim 2, wherein the server device is an origin endpoint for downloading the content, and the numerical class of service value is in a range greater than 1.

4. A method according to claim 2, wherein the server device is a proxy server between the client device and an origin endpoint for downloading the content, and the numerical class of service value is in a range between 0 and 1.

5. A method according to claim 1, wherein the content has multiple representations encoded at respective distinct bitrates for delivery to client devices, and wherein the server device conditionally switches between different bitrates for different content segments.

6. A method according to claim 5, wherein the conditional switching employs breadth-first allocation of bandwidth among a set of client devices of distinct classes of service, the breadth-first allocation including multiple passes for successively higher-class-of-service groups of clients, a first pass allocating a first bitrate to all the clients of all groups, and each successive pass first removing a lowest class-of-service group and then allocating a next higher bitrate to all clients of remaining higher-class-of-service groups.

7. A method according to claim 1, further including:
    accepting a content request from the client device; and
    determining the class of service of the client device for use in the pacing.

8. A method according to claim 7, wherein the class of service of the client device is specified in the content request.

9. A method according to claim 8, wherein the class of service is specified in one of an HTTP header and a URI query string parameter.

10. A method according to claim 7, wherein the class of service of the client is determined by looking up the class of service in a subscriber management system.

11. A method according to claim 10, wherein subscriber information is determined based on one or more of a source network address of the client device, a subscriber identifier specified in an HTTP header, and a subscriber identifier specified in a URI query string parameter.

12. A method according to claim 1, wherein an appropriate representation of the content is selected for delivery based on class of service restrictions selected from a maximum bitrate, maximum frame rate, and maximum resolution which may be delivered to the client device as specified for each class of service.

13. A method according to claim 1, wherein an appropriate representation of the content is selected for delivery to the client device based on current resource utilization estimate restrictions including a maximum bitrate which may be delivered to the client device, calculated in real-time to prevent exceeding an aggregate network capacity threshold for all client devices.

14. A method according to claim 1, wherein the target chunk send time corresponds to a target delivery rate being a class-of-service-based multiple of an encoded bitrate of the content.

15. A method according to claim 14, wherein higher classes of service are assigned larger multiples than lower classes of service, producing higher throughput and lower latency delivery for higher classes of service.

16. A method according to claim 1, wherein the inter-chunk delay is calculated based on using a fixed chunk size for delivery of the content.

17. A method according to claim 16, wherein the fixed chunk size is less than a window size used for managing transmissions in a transmission control protocol.

18. A server device, comprising:
    one or more processors;
    memory;
    input/output circuitry coupling the server device to a client device; and
    one or more high-speed data busses connecting the processors, memory and input/output circuitry together,
    the memory storing a set of computer program instructions executable by the processors to cause the server device to perform a method of delivering content to the client device, the method including:
        sending the content to the client device as a series of segments, the segments being sent using chunked delivery by which each segment is sent as a series of chunks; and
        pacing the sending in accordance with a class of service for the client device, the class of service having an associated target chunk send time over which each chunk is to be sent to the client device, the target chunk send time decreasing with higher classes of service, the pacing including:

sending a chunk over an actual chunk send time;
calculating an inter-chunk delay as a difference between the target chunk send time and the actual chunk send time; and
if the inter-chunk delay is positive, then waiting the inter-chunk delay before beginning to send a next successive chunk, and otherwise immediately beginning to send the next successive chunk.

19. A non-transitory computer-readable medium storing computer program instructions, the instructions being executable by a server device to cause the server device to perform a method of delivering content to a client device, the method including:

sending the content to the client device as a series of segments, the segments being sent using chunked delivery by which each segment is sent as a series of chunks; and pacing the sending in accordance with a class of service for the client device, the class of service having an associated target chunk send time over which each chunk is to be sent to the client device, the target chunk send time decreasing with higher classes of service, the pacing including:

sending a chunk over an actual chunk send time;
calculating an inter-chunk delay as a difference between the target chunk send time and the actual chunk send time; and
if the inter-chunk delay is positive, then waiting the inter-chunk delay before beginning to send a next successive chunk, and otherwise immediately beginning to send the next successive chunk.

* * * * *